United States Patent [19]

Nakamura et al.

[11] Patent Number: 4,984,195
[45] Date of Patent: Jan. 8, 1991

[54] EXTENDED BUS CONTROLLER

[75] Inventors: Masayuki Nakamura, Nagoya; Fujiya Ikuta, Kani, both of Japan

[73] Assignees: Hitachi, Ltd., Tokyo; Hitachi Chubu Software, Ltd., Aichi, both of Japan

[21] Appl. No.: 201,443

[22] Filed: Jun. 2, 1988

[30] Foreign Application Priority Data

Jun. 3, 1987 [JP] Japan .................... 62-139486

[51] Int. Cl.$^5$ .......................................... G06F 13/28
[52] U.S. Cl. .................... 364/200; 364/242.31; 364/270.3
[58] Field of Search ... 364/200 MS File, 900 MS File

[56] References Cited

U.S. PATENT DOCUMENTS

| | | | |
|---|---|---|---|
| 4,245,301 | 1/1981 | Rokutanda et al. | 364/200 |
| 4,428,044 | 1/1984 | Liron | 364/200 |
| 4,503,496 | 3/1985 | Holzner et al. | 364/200 |
| 4,516,199 | 5/1985 | Frieder et al. | 364/200 |
| 4,564,900 | 1/1986 | Smitt | 364/200 |

FOREIGN PATENT DOCUMENTS 57-34234 2/1982 Japan .

*Primary Examiner*—Michael R. Fleming
*Assistant Examiner*—Debra A. Chun
*Attorney, Agent, or Firm*—Antonelli, Terry, Stout & Kraus

[57] ABSTRACT

An extended bus controller includes a base module including at least a first peripheral control unit connected to a base bus, a central processing and controlling unit, and a memory unit; an extension module including at least a second peripheral control unit connected to an extended bus; a connection bus interconnecting the base bus of the base module and the extended bus of the extension module; a direct memory access control unit provided for at least one of the base module and the extension module for directly controlling data transfer between the first and second peripheral control units and the memory unit; a first master clock generator unit for supplying first master clocks to the direct memory access control unit and controlling the direct memory access control unit, the first master clocks having a first frequency determined by a data transmission delay time of at least one of the base bus, the connection bus and the extension bus, and by the performance of the first peripheral control unit and the memory unit; and a second master clock generator unit for supplying second master clocks to the direct memory access control unit and controlling the direct memory access control unit, the second master clocks having a second frequency determined by a data transmission delay time of at least one of the base bus, the connection bus and the extension bus, and by the performance of the second peripheral control unit and the memory unit.

8 Claims, 10 Drawing Sheets

EXTENDED BUS CONTROLLER

BACKGROUND OF THE INVENTION

The present invention relates to a computer system, and more particularly, to an extended bus controller suitable for improving the efficiency of data transfer via a plurality of busses.

An extended bus controller has a base module and an extension module, the former module including a central processing and controlling unit connected to a base bus, a memory unit, and peripheral control units, and the latter module including peripheral control units connected to an extended bus. Such a conventional extended bus controller is disclosed, for example, in Japanese Patent Laid-open Publication No. JP-A-57-34234. In the conventional extended bus controller, data transfer between the peripheral control units and the memory unit within the base module is conducted in synchronism with a synchronous clock signal from the central processing and controlling unit. On the other hand, data transfer between the peripheral control units and the memory unit within the extension module is conducted in synchronism with another synchronous clock signal having a lower frequency than that of the first-mentioned synchronous clock signal, the synchronous clock signal having the lower frequency being obtained by masking a predetermined number of synchronous clocks of the first-mentioned clock signal for the time corresponding to a delay time of data transmission between the peripheral control units and the memory unit within the extension module.

The above-described conventional technique poses the following problems. As the synchronous clock signal to be used in accessing the peripheral control units and the memory unit within the extension module, a synchronous clock signal which is derived from the synchronous clock signals on the base bus by adjusting it in units of its peripheral clock can only be obtained. Therefore, the efficiency of data transfer between the peripheral control units and the memory unit within the extension module cannot be optimized. Further, it is required that a circuit for masking the synchronous clock signal be prepared.

SUMMARY OF THE INVENTION

The present invention has been made in view of the above problems. An object of the present invention is to eliminate the above-described problems associated with the conventional extended bus controller, and to provide an extended bus controller capable of realizing optimum data transfer efficiency for both the base module and the extension module with a simple circuit configuration.

To achieve the above objects, the extended bus controller of this invention comprises:

a base module including at least one first peripheral control means connected to a base bus, a central processing and controlling unit, and memory means;

an extension module including at least one second peripheral control means connected to an extended bus;

a connection bus interconnecting the base bus of said base module and the extended bus of said extension module;

direct memory access control means provided for at least one of said base module and said extension module for directly controlling data transfer between said first and second peripheral control means and said memory means;

first master clock generator means for supplying first master clocks to said direct memory access control means and controlling said direct memory access control means, said first master clocks having a first frequency determined by a data transmission delay time of at least one of said base bus, connection bus and extension bus, and by the performance of said first peripheral control means and said memory means; and second master clock generator means for supplying second master clocks to said direct memory access control means and controlling said direct memory access control means, said second master clocks having a second frequency determined by a data transmission delay time of at least one of said base bus, connection bus and extension bus, and by the performance of said second peripheral control means and said memory means.

According to the present invention, the direct memory access controller (hereinafter referred to as the DMA controller), which controls data transfer between the memory unit and the peripheral control unit within the base module or the extension module, is arranged to have master clocks which optimize the efficiency of data transfer therebetween. Thus, an optimum overall data transfer efficiency can be attained with a simple circuit configuration.

DESCRIPTION OF THE PREFERRED EMBODIMENTS

Preferred embodiments of the present invention will be described in detail with reference to the accompanying drawings.

Figure 1:
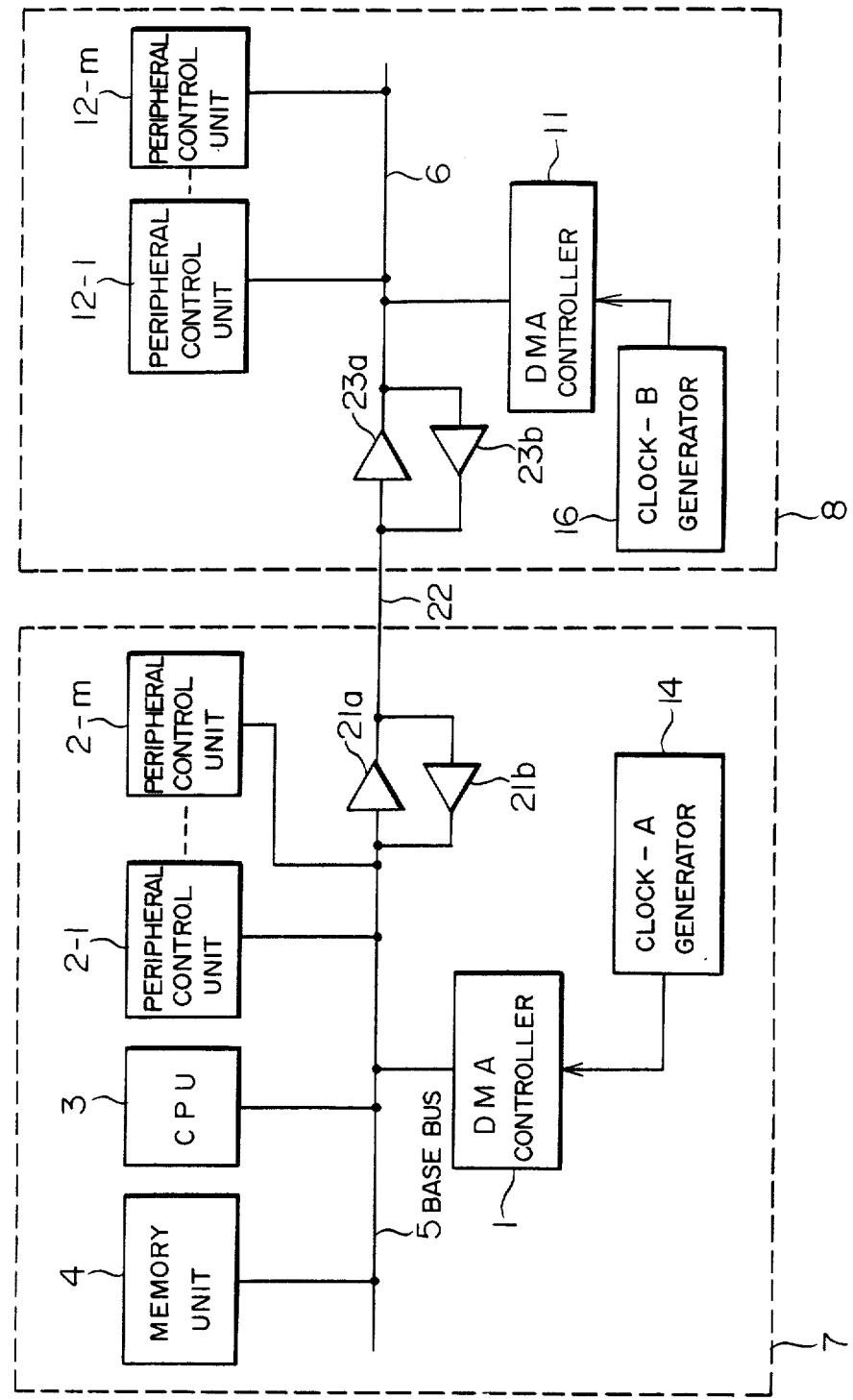
FIG. 1 is a block diagram showing a first embodiment of an extended bus controller according to the present invention.

FIG. 1 is a block diagram showing the first embodiment of the extended bus controller of the present invention.

In the first embodiment, a base module 7 and an extension module 8 are provided. The base module 7 comprises a memory unit 4 connected to a base bus 5, a central processing and controlling unit 3 (hereinafter simply called CPU), m (m≧1) peripheral control units 2-1, ..., 2-n, ..., 2-m, a DMA controller 1, a driver/receiver 21a, 21b, and a clock-A generator 14 for controlling the DMA controller 1. The extension module 8 comprises m (m≧1) peripheral control units 12-1, ..., 12-n, ..., 12-m, a DMA controller 11, a driver/receiver 23a, 23b, and a clock-B generator 16 for controlling the DMA controller 11. The base bus and the extended bus are connected by a connection bus 22.

The DMA controller 1 controls data transfer between the peripheral control units 2-1, ..., 2-m, which are connected to the base bus 5 and the memory unit 4, whereas the DMA controller 11 controls data transfer between the peripheral control units 12-1, ..., 12-m, which are connected to the extended bus 6 and the memory unit 4.

Figure 2:
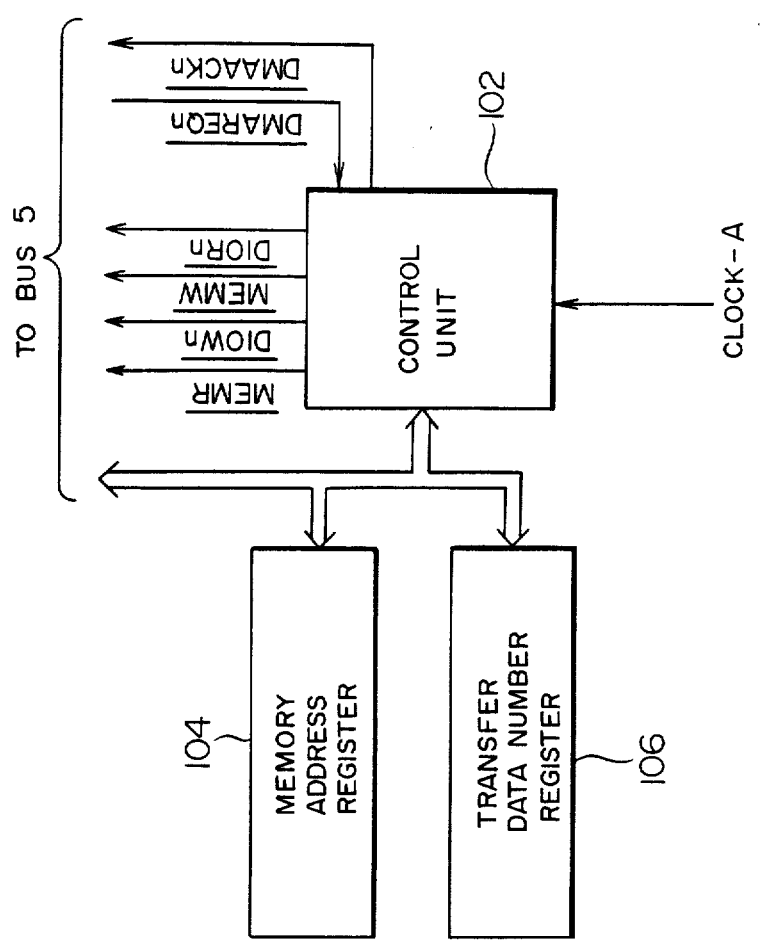
FIG. 2 is a block diagram briefly illustrating the structure of the DMA controller shown in FIG. 1.

The DMA controllers 1 and 11 have the same construction, the brief construction of the DMA controller 1 being shown in FIG. 2. The DMA controller 1 comprises a memory address register 104 which stores a transfer start address of the memory unit 4 at a data transfer, a transfer data number register 106 for storing a count of transfer data amount, and a control unit 102 which stores control information such as transfer mode information and controls data transfer between the memory unit 4 and the peripheral control units 2-1, ..., 2-m. The control unit 102 receives the clocks A as inputs, and outputs various control signals such as acknowledge signals $\overline{DMAACK_1}$, ..., $\overline{DMAACK_n}$, in response to transfer request signals $\overline{DMAREQ_1}$, ..., $\overline{DMAREQ_n}$. Shown in FIG. 2 are only those input/output signals of the control unit 102 which come from and go to one unit 2-n of the peripheral control unit 2-1, ..., 2-m, the other input/output signals coming from and to the remaining peripheral control units being omitted in FIG. 2.

The DMA controllers 1 and 11 may be an INTEL 8257.

The DMA controller 11 has the same construction as the DMA controller 1, so that the description of the construction of DMA controller 11 is omitted.

With reference to the embodiment described above, an operation to read data from the memory unit 4 and writing the data in one of the peripheral control units 2, e.g., unit 2-n connected to the base bus 4, or a so-called DMA memory read operation, will first be described.

Figure 3:
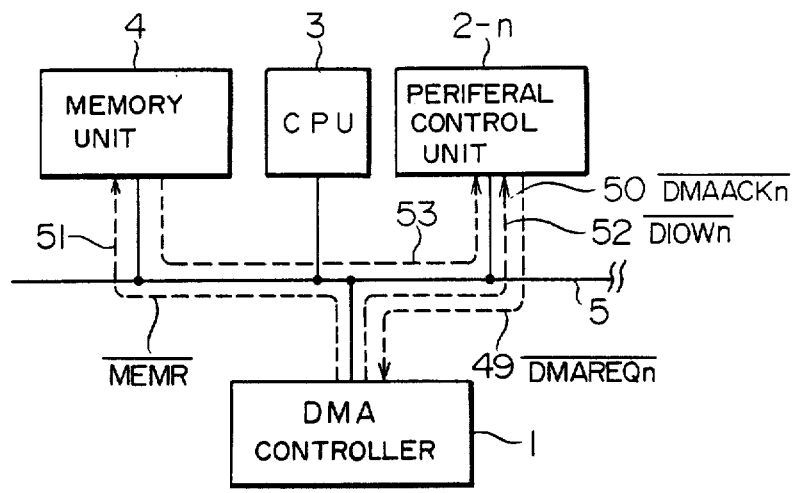
FIG. 3 illustrates the signal flow during the data transfer from the memory unit 4 to the peripheral control unit 2 shown in FIG. 1.
Figure 4:
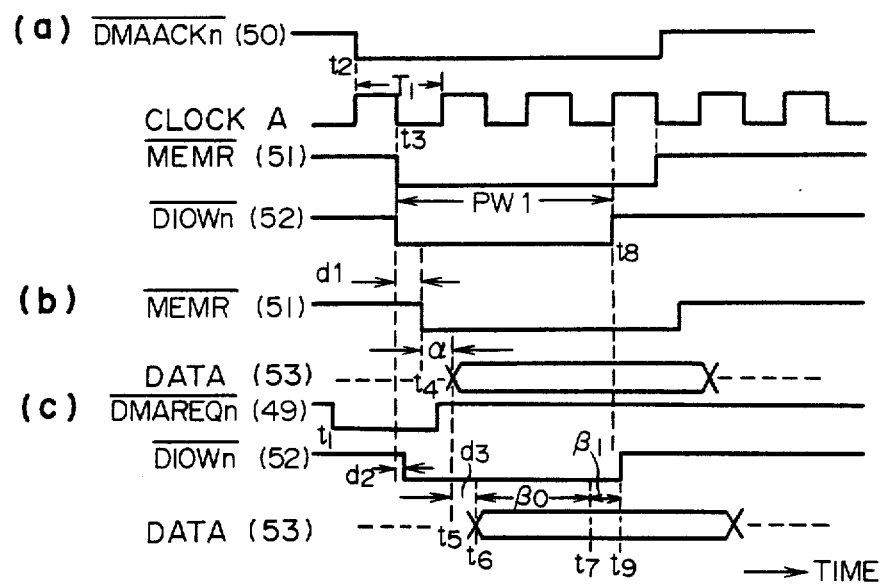
FIG. 4 is a timing chart used for explaining the memory read operation in FIG. 3.

FIG. 3 shows the signal flow during the DMA memory read operation, and FIG. 4 is a timing chart of various signals occurring during the DMA memory read operation.

As the peripheral control unit 2-n outputs a DMA transfer request signal 49 $\overline{DMAREQ_n}$ to the DMA controller 1 (time t1), the latter sends an acknowledge signal 50 $\overline{DMAACK_n}$ to the former (time t2). Thereafter, the DMA controller 1 outputs an address signal and a data read signal 51 $\overline{MEMR}$ to the memory unit 4 in synchronism with a clock-A, e.g., at its trailing edge, and outputs a data write signal 52 $\overline{DIOW_n}$ to the peripheral control unit 2-n (time t3). The timings of the above operation are shown in FIG. 4 wherein a memory read is performed, e.g., in 2.5 periods (2.5 T1) of the clock-A.

The DMA controller 1 divides the clock-A to generate signals $\overline{MEMR}$ and $\overline{DIOW_n}$.

The timing chart shown in FIG. 4 illustrates the timings of various signals at input/output points of the DMA controller 1 as represented by (a), of the memory unit 4 as represented by (b), and of the peripheral control unit 2-n as represented by (c), respectively, in FIG. 4. When the signal 51 $\overline{MEMR}$ takes a logical value "1" at the input point of the memory unit 4, memory unit 4 outputs the data 53 at the time t5 delayed by $\alpha$ nsec determined by the performance of the memory unit 4, and stops outputting the data when the signal 51 becomes "0". The peripheral control unit 2-n reads the data at the timing (time t9) when the signal 52 $\overline{DIOW_n}$ changes from a logical "1" to a logical "0" at the input point of the peripheral control unit 2-n.

In this case, it takes $(\beta_0+\beta_1)$ nsec from when the data was identified at the peripheral control unit 2-n (time t6) to when the signal 52 $\overline{DIOW_n}$ changes from the logical "1" to the logical "0" at the input point of the peripheral control unit 2-n (time t9), where $\beta_0$ represents a time determined by the performance of the peripheral control unit, and $\beta_1$ represents a certain margin time ($0 < \beta_1 < T1/2$, T1 is the period of clock-A).

In FIG. 4, d1 represents a transmission delay time required for the signal 51 $\overline{MEMR}$ outputted from the DMA controller 1 to reach the memory unit 4 via the base bus 5, d3 represents a transmission delay time required for the data 53 read out of the memory unit 4 to reach the peripheral control unit 2-n via the base bus 5, and d2 represents a transmission delay time required for the signal 52 $\overline{DIOW_n}$ outputted from the DMA controller 1 to reach the peripheral control unit 2-n.

Therefore, in order to attain a most effective data transfer, the period T1 of the master clock-A is set such that a time PW1 from the trailing edge of the signal 51 $\overline{MEMR}$ (time t3) to the leading edge of the signal 52 $\overline{DIOW_n}$, as seen at the output point of the DMA controller 1, becomes minimum. The time PW1 is the sum of transmission delay times d1, d2 and d3 of the signal $\overline{MEMR}$ and the data signal 53 on the base bus, times $\alpha$ and $\beta_0$ determined by the performance of the units 4 and 2-n, and $\beta_1$. Namely, the time PW1 becomes $d1+d3-d2+\alpha+\beta_0+\beta_1$, which is determined irrespective of whether the bus has been extended or not.

The transmission delay times d2 and d3 vary depending on the position of the peripheral control unit. In this case it is supposed that the time PW1 $(d1+d3-d2+\alpha+\beta_0+\beta_1)$ becomes maximum for the unit 2-n, which maximum time is represented by $PW_{1-n}$.

Next, an operation to write data of the peripheral control unit 2, e.g., from unit 2-n into the memory unit 4 (i.e., a so-called DMA memory write operation) will be described.

Figure 5:
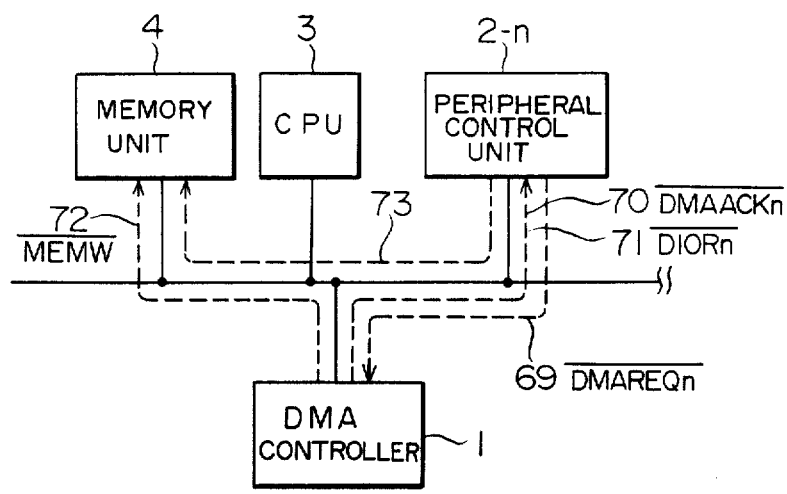
FIG. 5 illustrates the signal flow during the data transfer from the peripheral control unit 2 to the memory unit 4 shown in FIG. 1.
Figure 6:
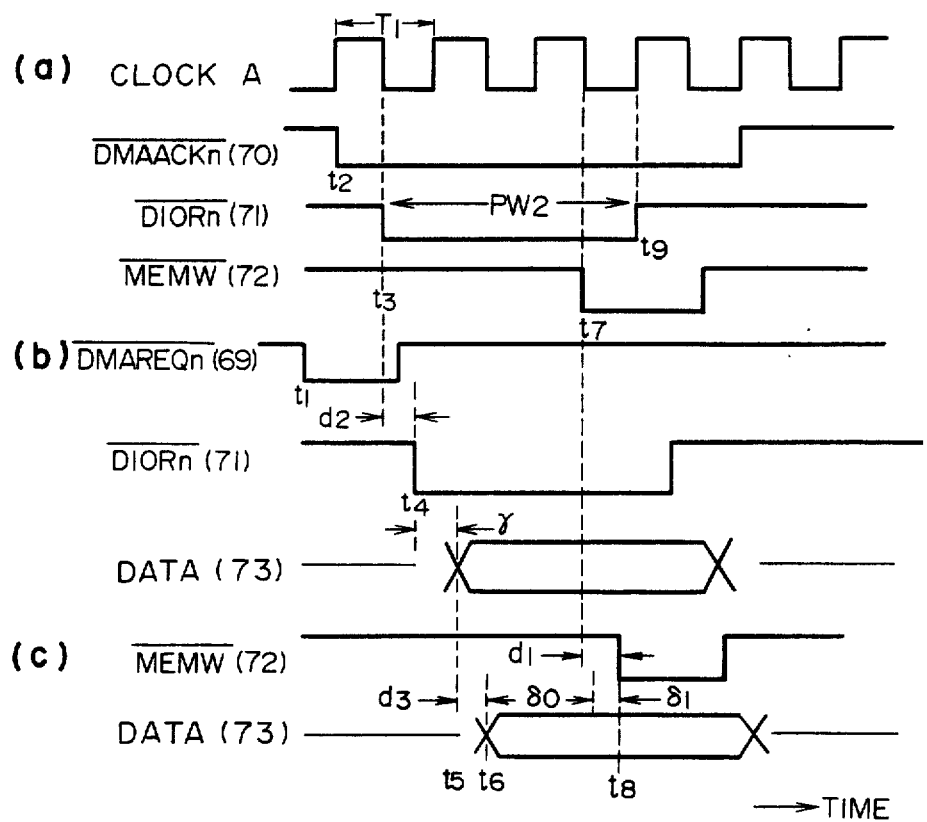
FIG. 6 is a timing chart used for explaining the memory write operation in FIG. 5.

FIG. 5 is a block diagram showing the signal flow during the DMA memory write operation, and FIG. 6 is a timing chart of various signals during the DMA memory write operation.

The timing chart shown in FIG. 6 illustrates the timings of various signals at input/output points of the DMA controller 1 as represented by (a), of the peripheral control unit 2-n as represented by (b), and of the memory unit 4 as represented by (c), respectively, in FIG. 6.

As the peripheral control unit 2-n outputs a DMA transfer request signal 69 $\overline{\text{DMAREQn}}$ to the DMA controller 1 (time t1), the latter sends an acknowledge signal 70 $\overline{\text{DMAACKn}}$ to the former 2-n (time t2). Thereafter, the DMA controller 1 outputs a data read signal 71 $\overline{\text{DIORn}}$ to the peripheral control unit 2-n in synchronism with the clock-A, e.g., at its trailing edge (time t3), and thereafter outputs an address signal and a data write signal 72 $\overline{\text{MEMW}}$ to the memory unit 4 in synchronism with clock-A, e.g., at its trailing edge (time t7).

In the above embodiment, the DMA memory read and write operations each are performed, e.g., in 2.5 periods of the clock-A.

When the signal $\overline{\text{DIORn}}$ takes a logical value "1" at the input point of the peripheral control unit 2-n (time t4), it outputs the data 73 at time (time t5) delayed by $\gamma$ nsec determined by the performance of the peripheral control unit 2-n, and stops outputting the data when the signal 71 $\overline{\text{DIORn}}$ takes a logical "0". The memory unit 4 writes the data therein when the signal 72 $\overline{\text{MEMW}}$ becomes a logical "1" at its input point (time t8).

In this case, it takes $(\delta_0+\delta_1)$ nsec from when the data was identified at the memory unit 4 (time t6) to when the signal 72 $\overline{\text{MEMW}}$ changes from the logical "0" to the logical "1" where $\delta_0$ represents a time determined by the performance of the memory unit, and $\delta_1$ represents a certain margin time $(0<\delta_1<T1/2)$.

In FIG. 6, d2 represents a transmission delay time required for the signal 71 $\overline{\text{DIORn}}$ outputted from the DMA controller 1 to reach the peripheral control unit 2-n via the base bus 5, d3 represents a transmission delay time required for the data 73 of the peripheral control unit 2-n to reach the memory unit 4 via the base bus 5, and d1 represents a transmission delay time required for the signal 71 $\overline{\text{MEMW}}$ outputted from the DMA controller 1 to reach the memory unit 4 via the base bus. The delay times d2 and d3 vary depending on the position of the peripheral control unit and it is assumed in this case that they become maximum for the peripheral control unit 2-n among the units 2-1 to 2-n.

Therefore, in order to attain a most effective data transfer, the period T1 of the master clock-A is set such that a time PW2 from the trailing edge of the signal 71 $\overline{\text{DIORn}}$ (time t3) to the leading edge of the signal 71 $\overline{\text{DIORn}}$ (time t9), as seen at the output point of the DMA controller 1, becomes minimum.

The time PW2 is the sum of $(d2+d3-d1+\alpha+\delta_0+\delta_1)$ which becomes maximum for peripheral control unit 2-n and is represented by $PW_{2\text{-}n}$.

As described above, the time $PW_{1\text{-}n}$ during the memory read operation and the time $PW_{2\text{-}n}$ during the memory write operation respectively for the peripheral control unit 2-n are given by:

$$PW_{1\text{-}n}=d1+d3-d2+\alpha+\beta_0+\beta_1$$

$$PW_{2\text{-}n}=d2+d3-d1+\gamma+\delta_0+\delta_1$$

The T1 of the clock-A is then determined as 1/2.5 of the larger one of the time $PW_{1\text{-}n}-\beta_1$ and the time $PW_{2\text{-}n}-\delta_1$.

With the above arrangement, the DMA controller 1 can perform most efficiently the memory read and write operation within the base module.

In this case, the margin time ($\beta_1$ or $\delta_1$) of the larger one of $PW_{1\text{-}n}-\beta_1$ and $PW_{2\text{-}n}-\delta_1$ is set at 0.

As can be appreciated, the period of the clock-A is determined based on the maximum time $PW_{1\text{-}n}$ or $PW_{2\text{-}n}$, respectively, among the times PW1 during the memory read operation and the times PW2 during the memory write operation, for the peripheral control units 2-1 to 2-n.

Next, data transfer between the peripheral control units 12 within the extension module and the memory unit 4 will be described.

It is assumed that the memory read or write operation is performed in, e.g., 2.5 periods of a clock-B.

First, an operation to read data from the memory unit 4 and write the data in one of the peripheral control units 12, e.g., unit 12-n connected to the extension bus 6, or a so-called DMA memory read operation, will first be described.

Figure 7:
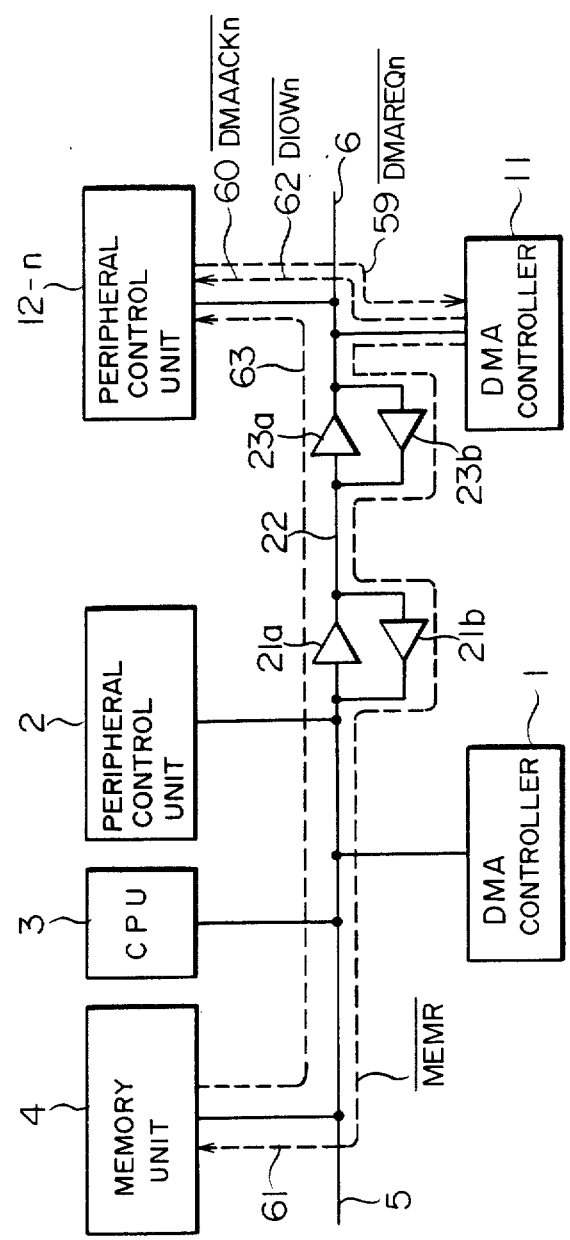
FIG. 7 illustrates the signal flow during the data transfer from the memory unit 4 to the peripheral control unit 12 shown in FIG. 1.
Figure 8:
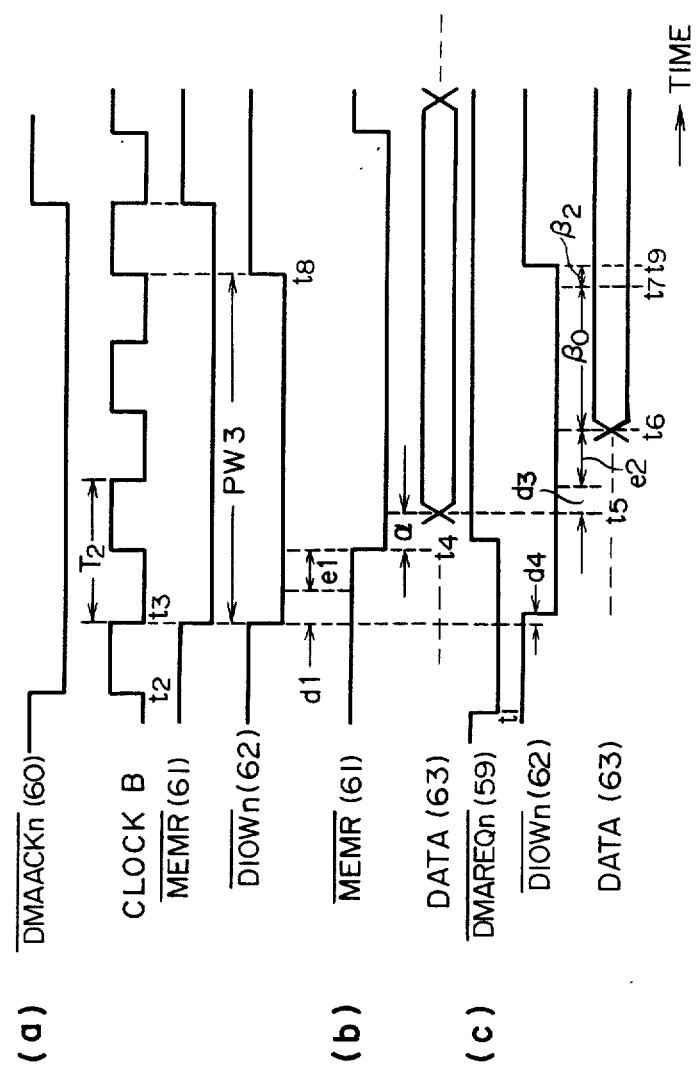
FIG. 8 is a timing chart used for explaining the memory read operation in FIG. 4.

FIG. 7 shows the signal flow during the DMA memory read operation, and FIG. 8 is a timing chart of various signals occurring during the DMA memory read operation.

As the peripheral control unit 12-n outputs a DMA transfer request signal 59 $\overline{\text{DMAREQn}}$ to the DMA controller 11 (time t1), the latter sends an acknowledge signal 60 $\overline{\text{DMAACKn}}$ to the former (time t2). Thereafter, the DMA controller 11 outputs an address signal and a data read signal 61 $\overline{\text{MEMR}}$ to the memory unit 4 in synchronism with a clock-B, e.g., at its trailing edge, and outputs a data write signal 62 $\overline{\text{DIOWn}}$ to the peripheral control unit 12-n (time t3).

The timing chart shown in FIG. 8 illustrates the timings of various signals at input/output points of the DMA controller 11 as represented by (a), of the memory unit 4 as represented by (b), and of the peripheral control unit 12-n as represented by (c), respectively, in FIG. 8. When the signal 61 $\overline{\text{MEMR}}$ takes a logical value "1" at the input point of the memory unit 4, it outputs the data 63 at a time (time t5) delayed by $\alpha$ nsec determined by the performance of the memory unit 4 and stops outputting the data 63 when the signal 61 becomes "0". The peripheral control unit 12-n reads the data at the timing (time t9) when the signal 62 $\overline{\text{DIOWn}}$ changes from a logical "1" to a logical "0" at the input point of the peripheral control unit 12-n.

In this case, it takes $(\beta_0+\beta_2)$ nsec from when the data was identified at the peripheral control unit 12-n (time t6) to when the signal 62 $\overline{\text{DIOWn}}$ changes from the logical "1" to the logical "0" at the input point of the peripheral control unit 2-n (time t9), where $\beta_0$ represents a time determined by the performance of the peripheral control unit, and $\beta_2$ represents a certain margin time $(0<\beta_2<T2/2$, T2 is a period of the clock-B). The times d1, d3, $\alpha$ and $\beta_0$ shown in FIG. 8 are assumed to have the same meanings and values as in FIG. 4.

In FIG. 8, d1+e1 represents a transmission delay time required for the signal 61 $\overline{\text{MEMR}}$ outputted from the DMA controller 11 to reach the memory unit 4, d3 represents a transmission delay time required for the data 63 read out of the memory unit 4 to reach the peripheral control unit 12-n, and d4 represents a transmission delay time required for the signal 62 $\overline{\text{DIOWn}}$ outputted from the DMA controller 11 to reach the peripheral control unit 12-n.

It is assumed that the peripheral control units 2-1 to 2-m, 12-1 to 12-m perform the same.

As compared with the memory read operation shown in FIG. 3, the memory read operation shown in FIG. 7 is added with a transmission delay time e1 of the signal 61 $\overline{\text{MEMR}}$ and a transmission delay time e2 of the data signal 63, respectively, at the driver/receiver 21b, 23b, the bus 22 and the extended bus 6. Therefore, a time PW3 from the trailing edge of the signal 61 $\overline{\text{MEMR}}$ to the leading edge of the signal $\overline{\text{DIOWn}}$ is added with about e1+e2 as compared with the time PW1. Namely, the time PW3 becomes the sum of (d1+e1+d3+e2−d−4+α+β$_0$+β$_2$).

The times d3 and d4 vary depending on the position of the peripheral control unit and it is assumed in this case that the times (d3+e2) and d4 become maximum for the peripheral control unit 12-n among the peripheral control units 12-1 to 12-m. Thus, the time PW3 becomes maximum for the peripheral control unit 12-n, which maximum time is represented by PW$_{3-n}$.

Next, an operation to write data of the peripheral control unit 12, e.g., unit 12-n into the memory unit 4 (i.e., a so-called DMA memory write operation) will be described.

Figure 9:
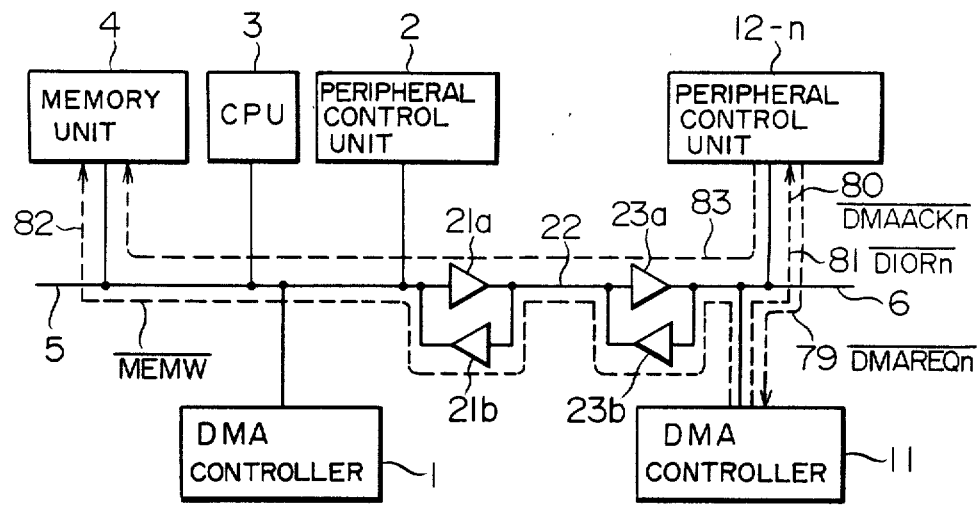
FIG. 9 illustrates the signal flow during the data transfer from the peripheral control unit 12 to the memory unit 4 shown in FIG. 1.
Figure 10:
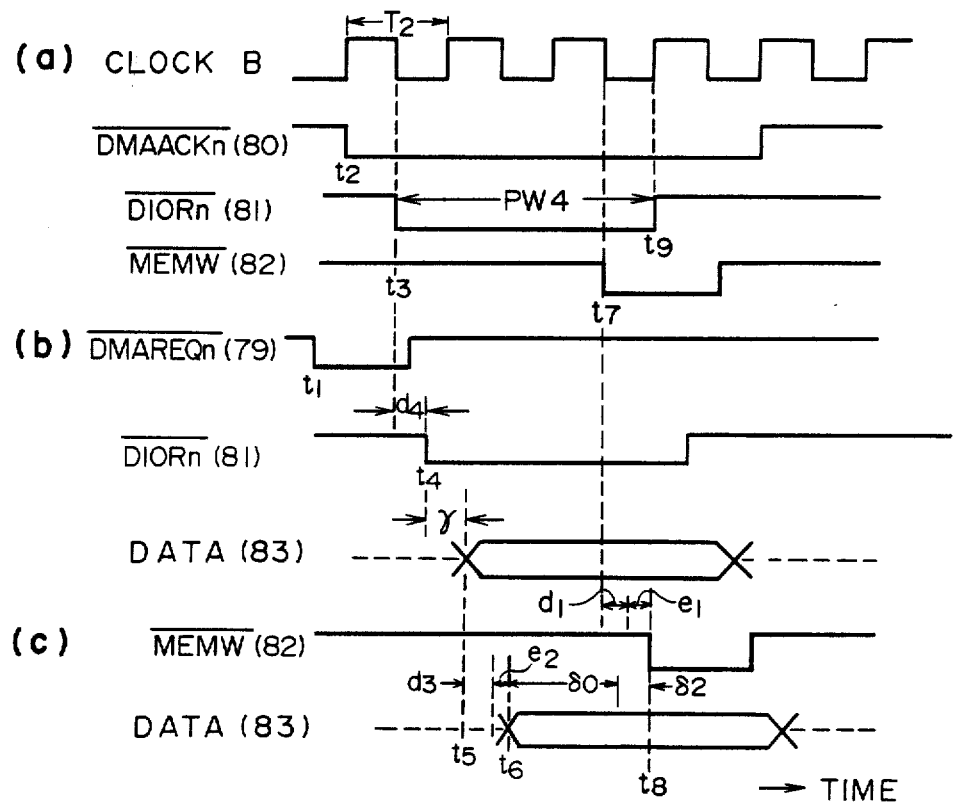
FIG. 10 is a timing chart used for explaining the memory write operation in FIG. 9.

FIG. 9 is a block diagram showing the signal flow during the DMA memory write operation, and FIG. 10 is a timing chart of various signals occurring during the DMA memory write operation.

The timing chart shown in FIG. 10 illustrates the timings of various signals at input/output points of the DMA controller 11 as represented by (a), of the peripheral control unit 12-n as represented by (b), and of the memory unit 4 as represented by (c), respectively, in FIG. 10.

As the peripheral control unit 12-n outputs a DMA transfer request signal 79 $\overline{\text{DMAREQn}}$ to the DMA controller 11 (time t1), the latter sends an acknowledge signal 80 $\overline{\text{DMAACKn}}$ to the former (time t2). Thereafter, the DMA controller 11 outputs a data read signal 81 $\overline{\text{DIORn}}$ to the peripheral control unit 12-n in synchronism with the clock-B, e.g., at its trailing edge (time t3), and thereafter outputs an address signal and a data write signal 82 $\overline{\text{MEMW}}$ to the memory unit 4 in synchronism with the clock-B, e.g., at its trailing edge (time t7).

When the signal $\overline{\text{DIORn}}$ takes a logical value "1" at the input point of the peripheral control unit 12-n (time t4), it outputs the data 83 at a time (time t5) delayed by γ nsec determined by the performance of the peripheral control unit 12-n, and stops outputting the data when the signal 81 $\overline{\text{DIORn}}$ takes a logical "0". The memory unit 4 writes the data therein when the signal 82 $\overline{\text{MEMW}}$ becomes a logical "1" at its input point (time t8).

In this case, it takes (δ$_0$+δ$_2$) nsec from when the data was identified at the memory unit 4 (time t6) to when the signal 82 $\overline{\text{MEMW}}$ changes from the logical "0" to the logical "1" where δ$_0$ represents a time determined by the performance of the memory unit, and δ$_2$ represents a certain margin time (0<δ$_1$<T2/2). The times d3, γ and δ$_0$ are assumed to have the same meanings and values as those in FIG. 6.

In FIG. 10, d4 represents a transmission delay time required for the signal 81 $\overline{\text{DIORn}}$ outputted from the DMA controller 11 to reach the peripheral control unit 12-n, d3+e2 represents a transmission delay time required for the data 83 of the peripheral control unit 12-n to reach the memory unit 4, and d1+e1 represents a transmission delay time required for the signal 82 $\overline{\text{MEMW}}$ outputted from the DMA controller 11 to reach the memory unit 4. In this case, it is supposed that the delay times d4 and (d3+e2) become maximum for the peripheral control unit 12-n among the units 12-1 to 12-m.

As compared with the memory write operation shown in FIG. 5, the memory write operation shown in FIG. 9 is added with, as shown in FIG. 10, a transmission delay time e1 of the signal 82 $\overline{\text{MEMW}}$ and a transmission delay time e2 of the data signal 83, respectively, at the driver/receiver 21b, 23b, the bus 22 and the extended bus 6. Therefore, a time PW4 from the trailing edge of the signal 81 $\overline{\text{DIORn}}$ to the leading edge of the signal 81 $\overline{\text{DIORn}}$ is added with about e1+e2 as compared with the time PW2. Namely, the time PW4 becomes the sum of (d3+e2+d4+γ+δ$_0$+δ$_2$−(d1+e1)).

As described above, the times (d3+e2) and d4 become maximum for the peripheral control unit 12-n among the peripheral control units 12-1 to 12-n. Thus, the time PW4 becomes maximum for the peripheral control unit 12-n, which maximum time is represented by PW$_{4-n}$.

As a result, the time PW$_{3-n}$ during the memory read operation and the time PW$_{4-n}$ during the memory write operation respectively for the peripheral control unit 12-n are given by:

$$PW_{3-n} = d1 + e1 + d3 + e2 - d4 + \alpha + \beta_0 + \beta_2$$

$$PW_{4-n} = d3 + e2 + d4 + \gamma + \delta_0 + \delta_1 - (d1 + e1)$$

The T2 of the clock-B is then determined as 1/2.5 of the larger one of the time PW$_{3-n}$−β$_2$ and the time PW$_{4-n}$−δ$_2$.

With the above arrangement, the DMA controller 11 can perform most efficiently the memory read and write operation within the extension module.

In this case, the margin time (β$_2$ or δ$_2$) of the larger one of PW$_{3-n}$−β$_2$ and PW$_{4-n}$−δ$_2$ is set at 0.

As appreciated, the master clocks for the DMA controllers 1 and 11 are independently set at an optimum setting so that an optimum data transfer efficiency can be obtained for both the base module and the extension module.

In the above embodiment, a DMA controller is provided within the extension module separately from the DMA controller within the base module. Therefore, if a system requires no extension of the bus, an additional DMA controller becomes unnecessary, thus preventing the system scale from becoming large and leading to cost effectiveness.

Next, a second embodiment of this invention will be described wherein a DMA controller is provided only within the base module and shared by the extension module.

Figure 11:
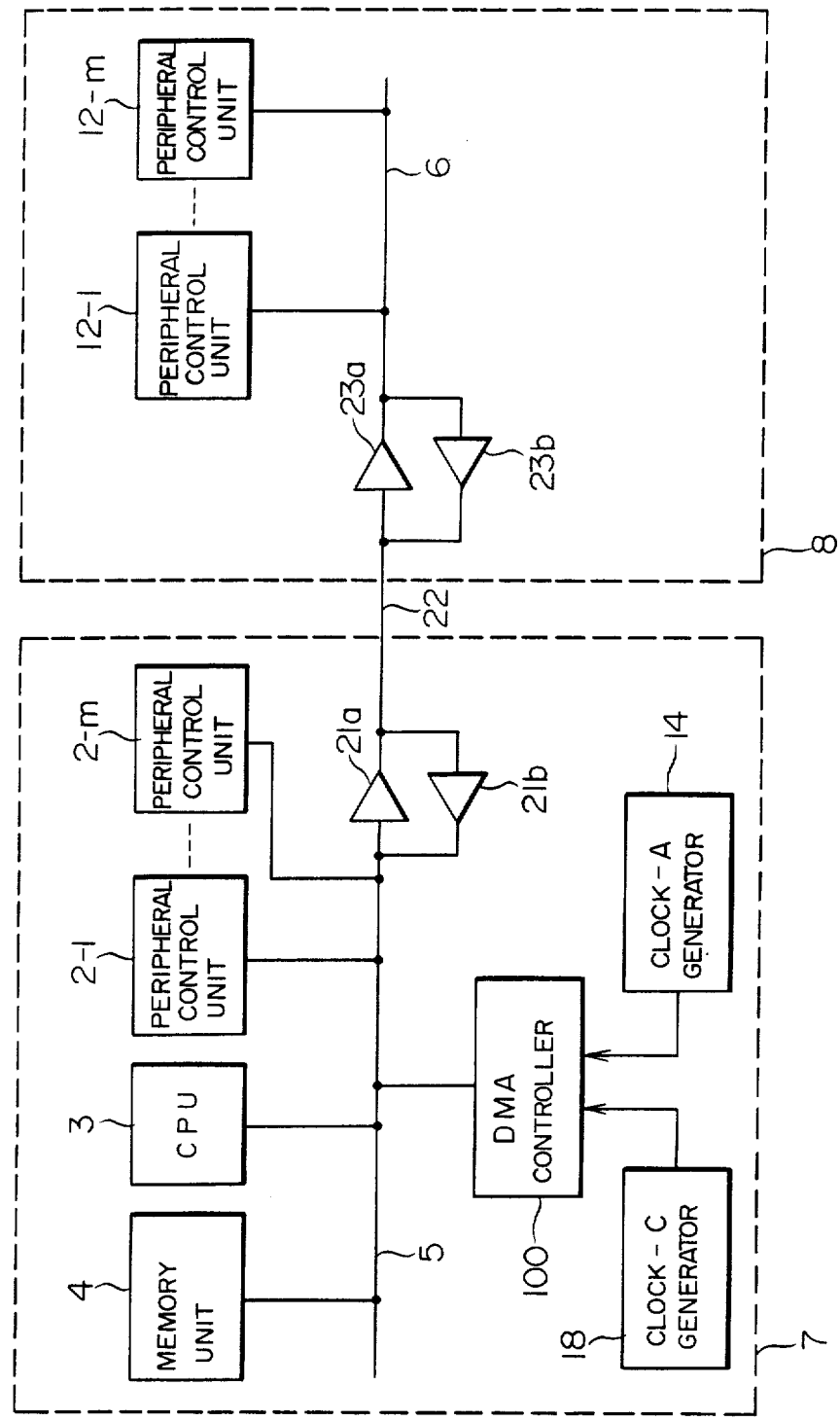
FIG. 11 is a block diagram showing a second embodiment of the extended bus controller according to the present invention.
Figure 12:
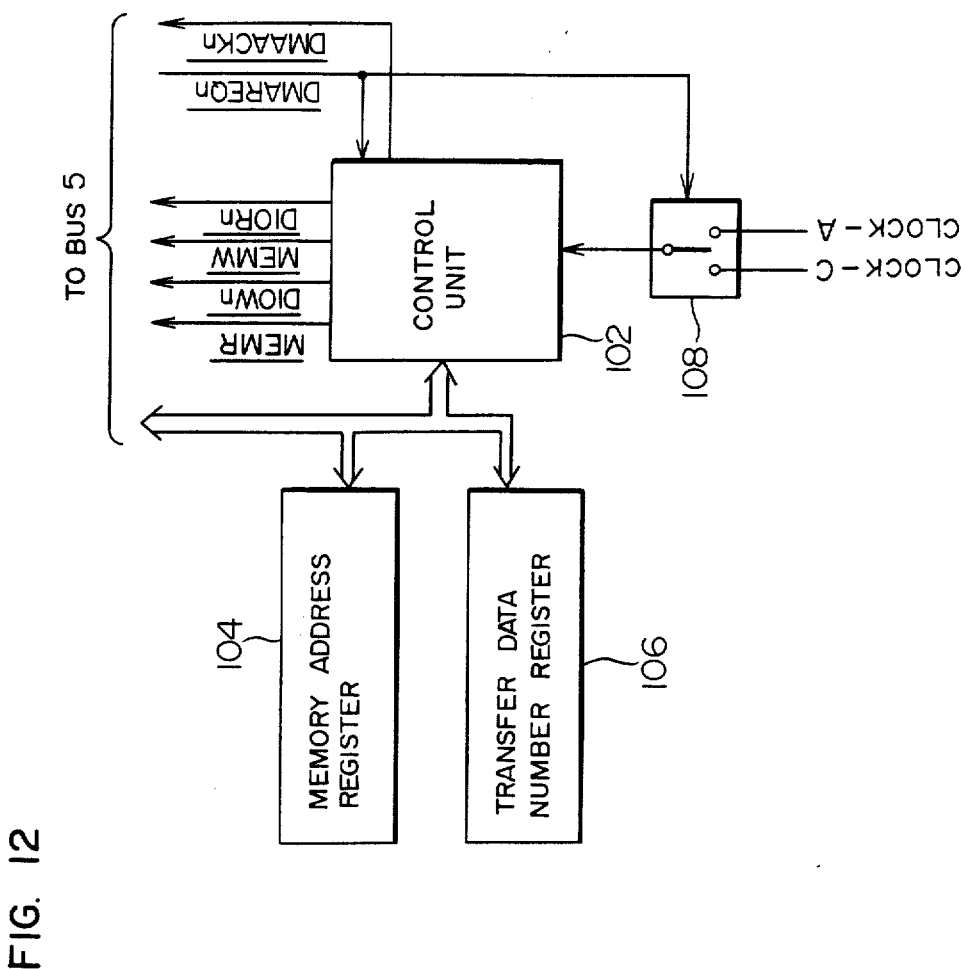
FIG. 12 is a block diagram showing the structure of the DMA controller shown in FIG. 11.

FIG. 11 is a block diagram showing the second embodiment of the extended bus controller, and FIG. 12 is a block diagram showing the construction of the DMA controller shown in FIG. 11. Those elements shown in FIGS. 11 and 12 having the same function as those shown in FIGS. 1 and 2 are represented by using identical reference numerals.

In this embodiment, a DMA controller 100 shared by both the base and extension modules is provided within the base module 7. The DMA controller 100 is supplied with a master clock-A for use with data transfer between the memory unit 4 and the peripheral control units 2-1 to 2-n, and with a master clock-C for use with data transfer between the memory unit 4 and the peripheral control units 12-1 to 12-n. The master clocks clock- A and clock-C are generated by a clock A generator 14 and a clock-C generator 18, respectively.

As shown in FIG. 12, the DMA controller 100 comprises a memory address register 104 which stores a transfer start address of the memory unit 4 at a data transfer, a transfer data number register 106 for storing a count of transfer data amount, a control unit 102 which stores control information such as transfer mode information and controls data transfer between the memory unit 4 and the peripheral control units 2-1, ..., 2-m, 12-1, ..., 12-m, and a switch circuit 108 for selecting one of clocks-A and clocks-C and supplying a selected one of the clocks to the control unit 102.

Upon reception of a transfer request signal $\overline{DMA\ REQ}$ from one of the peripheral control units 2-1 to 2-m and 12-1 to 12-m, the switch circuit 108 selects the clock-A if the transfer request signal is sent from one of the peripheral control units 2-1 to 2-m within the base module, or selects the clock-C if the transfer request signal is sent from one of the peripheral control units 12-1 to 12-m within the extension module, to supply a selected master clocks clock-A or clock-C to the control unit 102.

The period T1 of the clock-A is set in a similar manner as the clock-A in the first embodiment.

The period of the clock-C is set in a similar manner as in the first embodiment, taking into consideration of the performance of the memory unit 4 and the peripheral control units 12-1 to 12-m, and the transmission delay times the base bus, extension bus and connection bus 22.

Furthermore, a DMA controller may be provided only within the extension module and shared by the base module.

Figure 13:
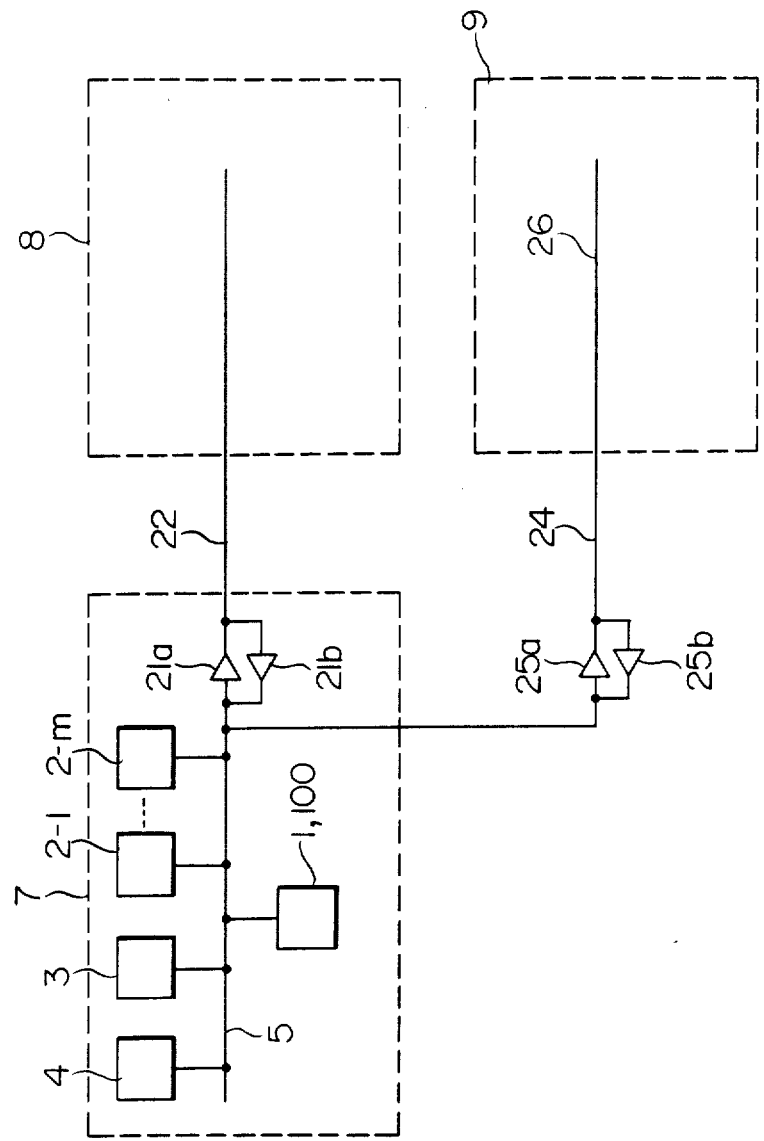
FIG. 13 is a block diagram showing a third embodiment of the extended bus controller according to the present invention.

The third embodiment of this invention is illustrated in FIG. 13. According to this embodiment of the present invention, a plurality of extension modules 8 may be provided in parallel with the base module. As one example of this, the provision of two extension modules is shown in FIG. 13. In this case, an additional extension module 9, which has the same construction as of the extension module 8 shown in FIG. 1 or FIG. 11, is connected to the base module together with the extension module 8.

The extension module 9 is connected to the base bus 5 via a connection bus 24 and a driver/receiver 25a, 25b. A DMA controller may be provided only within the base module, or within both the base and extension modules 8 and 9. The period of the master clock for controlling the extension module 9 is set in a similar manner as in the first or second embodiment, taking into consideration the transmission delay times on the extension bus 26, connection bus 24 and base bus 5.

In the above embodiments, the clock generators 14 to 18 may generate clocks clock-A, clock-B and clock-C by dividing the clock signal from the CPU 3.

According to the present invention, a peripheral control unit having the same circuit arrangement can be connected to both the base module and the extension module so that an optimum data transfer efficiency can be obtained for each module with a simple logical circuit arrangement.

We claim:

1. An extended bus controller comprising:
a base module including at least one first peripheral control unit, a base bus, a central processing and controlling unit, and memory means for storing data, each of said at least one first peripheral control unit, said central processing and controlling unit, and said memory means being connected to said base bus;
an extension module including an extended bus and at least one second peripheral control unit connected to the extended bus;
a connection bus interconnecting the base bus of said base module and the extended bus of said extension module;
direct memory access control means provided for at least one of said base module and said extension module for directly controlling data transfer between said at least one first peripheral control unit and said at least one second peripheral control unit and said memory means;
first master clock signal generator means for supplying a first master clock signal to said direct memory access control means and controlling said direct memory access control means, said first master clock signal having a first frequency determined by a data transmission delay time associated with at least one of said base bus, said connection bus and said extension bus, and by performance of said at least one first peripheral control unit and said memory means; and
second master clock signal generator means for supplying a second master clock signal to said direct memory access control means and controlling said direct memory access control means, said second master clock signal having a second frequency determined by a data transmission delay time associated with at least one of said base bus, said connection bus and said extension bus, and by performance of said at least one second peripheral control unit and said memory means.

2. An extended bus controller according to claim 1, wherein said direct memory access control means controls data transfer between said memory means and said at least one first peripheral control unit in accordance with said first master clock signal, and controls data transfer between said memory means and said at least one second peripheral control unit in accordance with said second master clock signal.

3. An extended bus controller according to claim 2, wherein:
said direct memory access control means is provided within said base module and connected to said base bus;
said first master clock signal is determined based on a data transmission delay time on said base bus and the performance of said at least one first peripheral control unit and said memory means; and
said second master clock signal is determined based on data transmission delay times on said base bus, said connection bus and said extended bus, and the performance of said second peripheral control unit and said memory means.

4. An extended bus controller according to claim 1, wherein:
said direct memory access control means comprises a first direct memory access controller connected to said base bus and a second direct memory access controller connected to said extended bus;
said first direct memory access controller controls data transfer between said memory means and said at least one first peripheral control unit in accordance with said first master clock signal; and
said second direct memory access controller controls data transfer between said memory means and said at least one second peripheral control unit in accordance with said second master clock signal.

5. An extended bus controller according to claim 4, wherein:
said first master clock signal is determined based on a data transmission delay time on said data base bus and the performance of said at least one first peripheral control unit and said memory means; and
said second master clock signal is determined based on data transmission delay times on said base bus, said connection bus and said extension bus and the performance of said at least one second peripheral control unit and said memory means.

6. An extended bus controller comprising;
a base module including at least one first peripheral control unit, a base bus, a central processing and controlling unit, and memory means for storing data, each of said at least one first peripheral control unit, said central processing and controlling unit, and said memory means being connected to said base bus;
an extension module including an extended bus and at least one second peripheral control unit connected to the extended bus;
a connection bus interconnecting the base bus of said base module and the extended bus of said extension module;
direct memory access control means provided for at least one of said base module and said extension module for directly controlling data transfer between said at least one first peripheral control unit and said at least one second peripheral control and said memory means;
first master clock signal generator means for supplying a first master clock signal to said direct memory access control means and controlling said direct memory access control means, said first master clock signal having a first frequency determined by a data transmission delay time associated with at least one of said base bus, said connection bus and said extension bus, and by performance of said at least one first peripheral control unit and said memory means; and
second master clock signal generator means for supplying a second master clock signal to said direct memory access control means and controlling said direct memory access control means, said second master clock signal having a second frequency determined by a data transmission delay time associated with at least one of said base bus, said connection bus and said extension bus, and by performance of said at least one second peripheral control unit and said memory means;
said direct memory access control means including means for selecting said first master clock signal in response to a data transfer request sent from said at least one first peripheral control unit and for controlling data transfer between said memory means and said at least one first peripheral control unit in accordance with said first master clock signal, and means for selecting said second master clock signal in response to a data transfer request sent from said at least one second peripheral control unit for controlling data transfer between said memory means and said at least one second peripheral control unit in accordance with said second master clock signal.

7. An extended bus controller according to claim 6, wherein:
said direct memory access control means is provided within said base module and connected to said base bus;
said first master clock signal is determined based on data transmission delay times on said base bus and the performance of said at least one first peripheral control unit and said memory means; and
said second master clock signal is determined based on data transmission delay times on said base bus, said connection bus and said extended bus, and the performance of said at least one second peripheral control unit and said memory means.

8. An extended bus controller comprising:
a base module including at least one first peripheral control unit, a base bus, a central processing and controlling unit, and memory means for storing data, each of said at least one peripheral control unit, said central processing and control unit, and said memory means being connected to said base bus;
an extension module including an extended bus and at least one second peripheral control unit connected to the extended bus;
a connection bus interconnecting the base bus of said base module and the extended bus of said extension module;
first direct memory access control means provided in said base module and connected to said base bus for controlling data transfer between said at least one first peripheral control unit and said memory means;
second direct memory access control means provided in said extension module and connected to said extension bus for controlling data transfer between said at least one second peripheral control unit and said memory means;
first master clock signal generator means for supplying a first master clock signal to said first direct memory access control means and controlling said first direct memory access control means, said first master clock signal having a first frequency determined by a data transmission delay time associated with said base bus and by performance of said at least one first peripheral control unit and said memory means; and
second master clock signal generator means for supplying a second master clock signal to said second direct memory access control means and controlling said second direct memory access control means, said second master clock signal having a second frequency determined by said data transmission delay times associated with said base bus and said extension bus, and by performance of said at least one second peripheral control unit and said memory means;
said first direct memory access control means including means for controlling data transfer between said memory means and said at least one first peripheral control unit in accordance with said first master clock signal and in response to a data transfer request sent from said at least one first peripheral control unit; and
said second direct memory access control means including means for controlling data transfer between said memory means and said at least one second peripheral control unit in accordance with said second master clock signal and in response to a data transfer request sent from said at least one second peripheral control unit.

* * * * *